United States Patent [19]

Gilles et al.

[11] Patent Number: 5,337,370
[45] Date of Patent: Aug. 9, 1994

[54] CHARACTER RECOGNITION METHOD EMPLOYING NON-CHARACTER RECOGNIZER

[75] Inventors: Andrew Gilles; Daniel Hepp, both of Ann Arbor, Mich.

[73] Assignee: Environmental Research Institute of Michigan, Ann Arbor, Mich.

[21] Appl. No.: 843,408

[22] Filed: Feb. 28, 1992

[51] Int. Cl.$^5$ ............................................. G06K 9/62
[52] U.S. Cl. ...................................... 382/14; 382/25; 382/30; 395/21
[58] Field of Search ...................... 382/14, 15, 20, 34, 382/18, 25; 395/20, 21, 50, 54

[56] References Cited

U.S. PATENT DOCUMENTS

| | | | |
|---|---|---|---|
| 4,599,693 | 7/1986 | Denenberg | 382/15 |
| 4,891,750 | 1/1990 | Pastor et al. | 382/25 |
| 4,932,065 | 6/1990 | Feldgajer | 382/14 |
| 4,958,375 | 9/1990 | Reilly et al. | 382/14 |
| 4,989,259 | 1/1991 | Takahashi et al. | 382/25 |
| 5,018,211 | 5/1991 | Jaffe et al. | 382/25 |
| 5,058,182 | 10/1991 | Kuan et al. | 382/25 |
| 5,086,479 | 2/1992 | Takanaga et al. | 382/14 |
| 5,105,468 | 4/1992 | Guyon et al. | 382/14 |

Primary Examiner—Joseph Mancuso
Attorney, Agent, or Firm—Krass & Young

[57] ABSTRACT

A method for recognition of an unconstrained written character image employs at least one non-character recognizer in addition to character recognizers for each candidate character. The input image is rejected if any of the non-character recognizers produces a match. The input image is recognized only if a) a character recognizer produces a match, and b) none of the non-character recognizers produces a match. The non-character recognizers are preferably trained on a) images which are not recognized by the set of character recognizers, B) images which are misclassified by at least one of the set of character recognizers result, and c) incorrectly segmented images. In the preferred embodiment of this invention individual segmented digit images are recognized for automatic sorting of mail by ZIP code. In the preferred embodiment plural character recognizers and at least one non-character recognizer are embodied in a neural network using a place encoding output. The preferred embodiment includes window encoding of the normalized image and plural cavity feature images derived from the normalized image. A set of encoded values is computed from the ratio of the number of stroke pixels within the overlapping windows divided by the size of the window.

31 Claims, 7 Drawing Sheets

FIG - 3
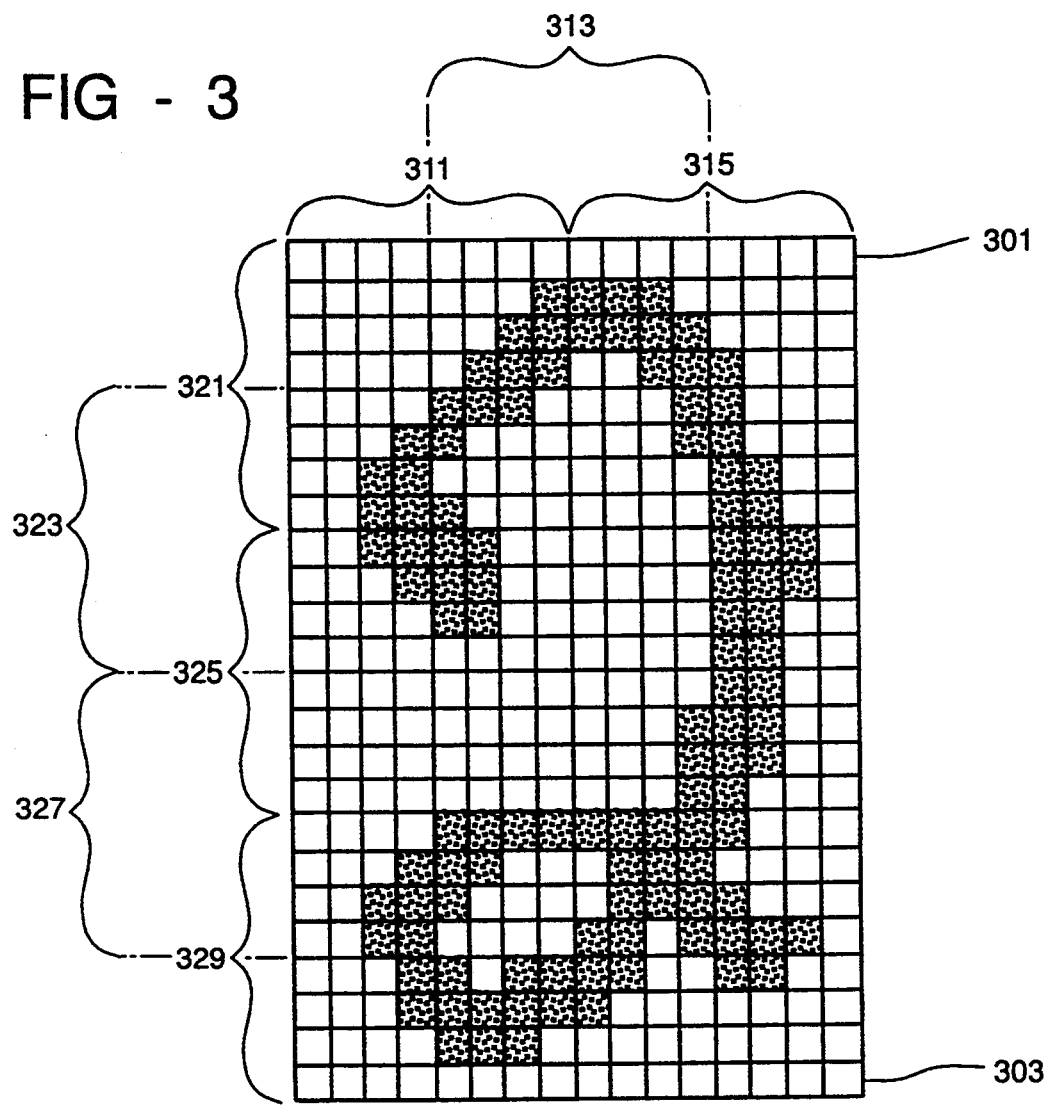
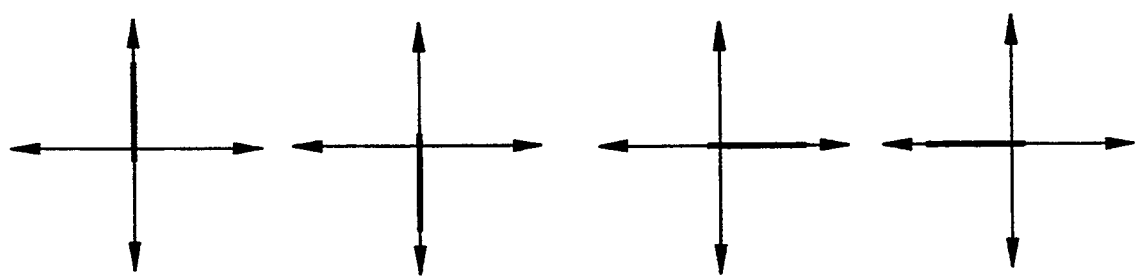
FIG - 4A    FIG - 4B    FIG - 4C    FIG - 4D

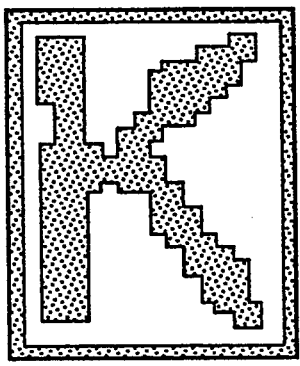
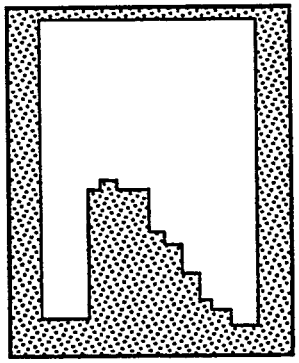
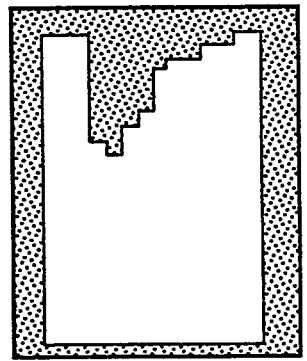
FIG - 7A     FIG - 7B     FIG - 7C
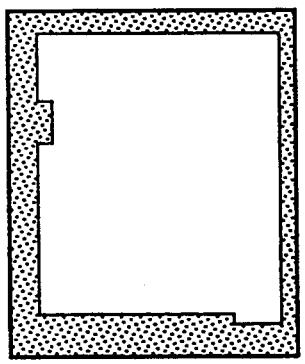
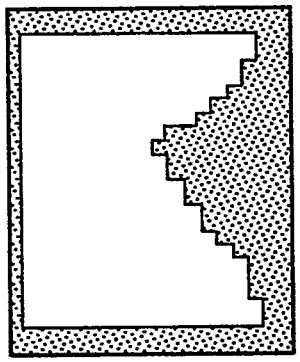
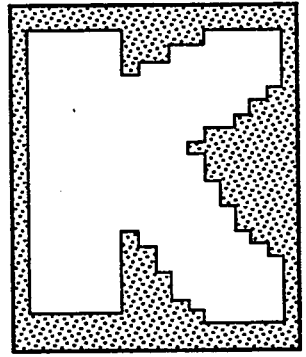
FIG - 7D     FIG - 7E     FIG - 7F
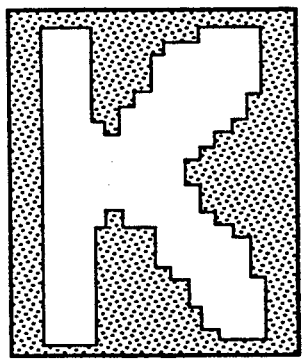
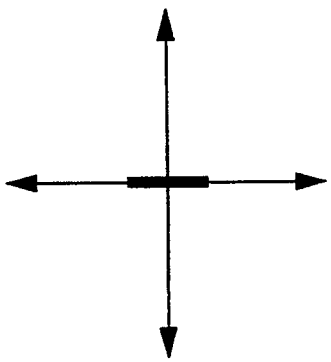
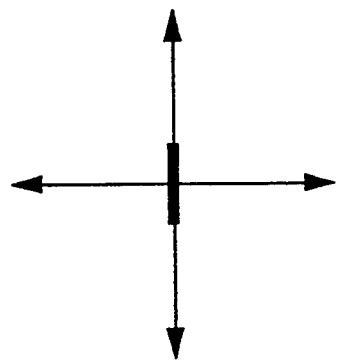
FIG - 7G     FIG - 8A     FIG - 8B

CHARACTER RECOGNITION METHOD EMPLOYING NON-CHARACTER RECOGNIZER The United States government has a nonexclusive right to use this invention pursuant to contract 104230-86-H-0042, awarded by the U.S. Postal Service Office of Advanced Technology.

TECHNICAL FIELD OF THE INVENTION

The technical field of the present invention is that of optical character recognition and more particularly recognition of handwritten digits.

BACKGROUND OF THE INVENTION

There are many instances where it would be useful or desirable to provide a computer readable form of a document not available in a compatible computer readable form. Normally it is the case that the document is not available in machine readable form. This could be because the document was handwritten or typewritten and thus no computer readable form exists, or it could be because the computer readable form is not available. In some instances this is a "foreign" document, i.e., a computer readable form does exist but document was produced on an incompatible computer system. In some instances, such as facsimile transmission, a simple optical scan of the document can produce the required form. In many instances the form most useful for later use and decision making is a separate indication of each character of the document.

The field of optical character recognition deals with this problem. The optical character recognizer scans the document in some fashion to produce an electrical indication of the marks of the document. A computer analyzes this indication of the marks to produce an indication of each character of the document. It is within the current state of the art to produce relatively error free indication of many typewritten and printed documents. The best systems of the prior art are capable of properly distinguishing several differing type fonts and of reading kerned text. This is not the case for unconstrained handwritten characters.

The problem of properly reading unconstrained handwritten characters is difficult because of the great variability of the characters. One person may not write the same character exactly the same every time. The variability between different persons writing the same character is even greater than the variability of a single person. In addition to the variability of the characters themselves, handwritten text is often not cleanly executed. Thus characters may overlap horizontally. Loops and descenders may overlap vertically. Further, the individual written lines may be on a slant or have an irregular profile. Thus recognition of handwritten characters is a difficult task.

An example of a field where recognition of handwritten characters would be very valuable is in mail sorting. Each piece of mail must be classified by destination address. A large volume of typewritten and printed mail is now read and sorted using prior art optical character recognition techniques. There remains roughly 15% of current U.S. mail that is hand addressed. Present technology uses automated conveyer systems to present these pieces of mail, one at a time, to an operator who views the address and enters a code for the destination. This is the most labor intensive and slowest part of the entire mail sorting operation.

Sorting of handwritten mail is an area having a unique set of characteristics. First, because of the problem of user acceptance, it is not feasible to place further constraints on the address. Thus address lines or individual character boxes, which would be useful in regularizing the recognition task, are ruled out. On the other hand, there already exists a relatively constrained portion of the current address. The 5 or 9 digit ZIP code employed in most handwritten destination addresses provides the information needed for the primary sorting operation. This information is relatively constrained because the ZIP code consists of only digits. In addition the ZIP code is usually located at the end of the last line of the destination address, thus reducing the task of proper location.

It would thus be useful in the art to provide a manner of recognizing unconstrained handwritten digits.

SUMMARY OF THE INVENTION

A method for recognition of an unconstrained handwritten character image employs a non-character recognizer in addition to character recognizers for each candidate character. In the preferred embodiment of this invention individual segmented digit images are recognized for automatic sorting of mail by ZIP code. The character images to be recognized are obtained by scanning the mail, determining the location of the ZIP code block, segmenting this ZIP code block into individual digit images, and normalizing the images to predetermined pixel dimensions.

In the preferred embodiment plural character recognizers and at least one non-character recognizer are embodied in a neural network. The preferred embodiment includes window encoding of the normalized image and plural feature images derived from the normalized image. Each feature image including only pixels exhibiting a predetermined feature of the normalized image. In the preferred embodiment these feature images include a North cavity feature image, a South cavity feature image, an East cavity feature image, a West cavity feature image, a Hole image and a Center cavity feature image. These cavity feature images are formed according to a set of morphological equations.

A set of encoded values is computed for each set of a normalized image and its corresponding feature images. In the preferred embodiment the normalized image has a size of 22 rows and 16 columns of pixels. This image size is divided into five rows of three columns of overlapping 8 by 8 pixel windows. A value is encoded for each of these fifteen windows for each of the seven images. The encoded value is the ratio of the number of stroke pixels within the window divided by the size of the window in pixels.

Character recognition takes place using a neural network. The neural network includes a layer of input neurons equal to the number of encoded values. Each input neuron receives a corresponding encoded value as input. In the preferred embodiment there are 105 encoded values and 105 input neurons. The neural network includes at least one layer of hidden neurons. There are preferably two hidden layers of 25 and 15 neurons. The neural network includes a layer of output neurons equal to one more than the number of digits in the set of candidate digits.

Each of the hidden and output neurons include predetermined synaptic weights set using error back propagation on a set of training images. The training images include images of each candidate digit as well as non-digit images. These non-digit images include a) images which when presented to the neural network result in no output on any of the digit output neurons exceeding the corresponding character recognition threshold, and b) images which when presented to the neural network result in an output on at least one of said digit output neuron of corresponding to an incorrect digit exceeding the corresponding character recognition threshold. In the preferred embodiment, in which the images come from segmented portions of actual mail, the training images for the non-digit output also include incorrectly segmented images.

The neural network employs place encoding. There is one output neuron corresponding to each candidate digit and one non-digit output neuron. The recognition method rejects recognition of the input image if the non-digit output neuron produces an output exceeding a predetermined non-digit recognition threshold. The recognition method recognizes the input image as one of the candidate digits only if a) the corresponding output neuron produces an output exceeding a corresponding predetermined digit recognition threshold, and b) the non-digit output neuron does not produce an output exceeding the predetermined non-digit recognition threshold.

This recognition method may also be used for recognition of other types of unconstrained handwritten character images. A set of character recognizers includes a character recognizer for each candidate character. At least one non-character recognizer is also included. The input image is rejected if any of the non-character recognizers produces a match. The input image is recognized only if a) a character recognizer produces a match, and b) none of the non-character recognizers produces a match. The non-character recognizers are preferably trained on a) images which are not recognized by the set of character recognizers, B) images which are misclassified by at least one of the set of character recognizers, and c) incorrectly segmented images.

BRIEF DESCRIPTION OF THE DRAWINGS

These and other objects and aspects of the present invention will become clear from the following description of the invention, in which:

FIG. 3 illustrates an example of a normalized digit disposed in a set of windows employed for classification;

FIGS. 4a to 4d illustrate respective North, South, East and West structuring elements used in cavity feature detection;

FIGS. 7a to 7g illustrate the original image and smear features in accordance with an alternative embodiment of the feature detection of this invention;

FIGS. 8a and 8b illustrate respective horizontal and vertical smear structuring elements used in smear feature detection;

DETAILED DESCRIPTION OF THE PREFERRED EMBODIMENTS

Figure 1:
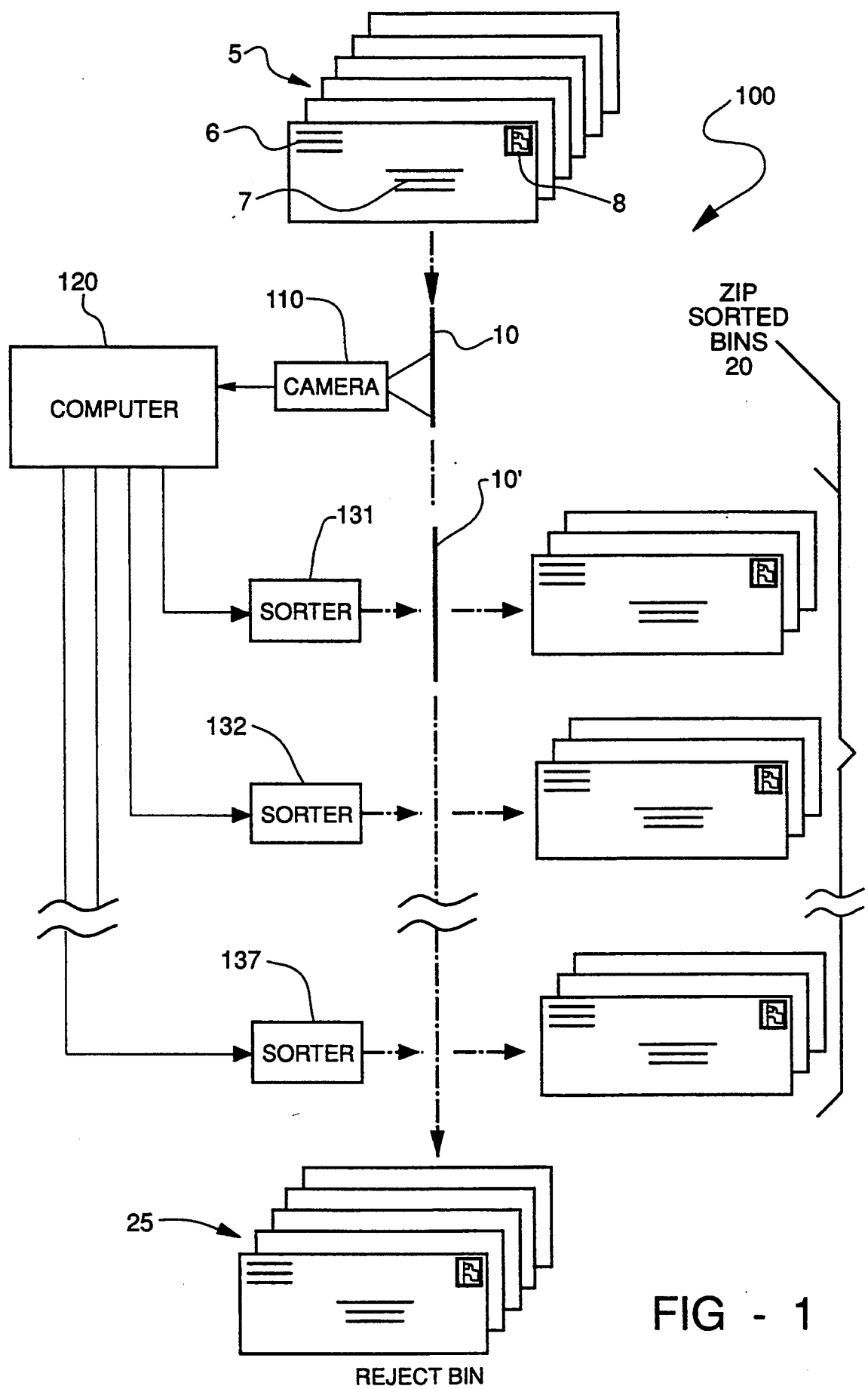
FIG. 1 illustrates the ZIP code recognition hardware of the preferred embodiment of the present invention.

FIG. 1 illustrates the general structure of the handwritten digit recognition system 100 according to the preferred embodiment of the present invention. An input stack 5 of unsorted letters, each of which may include a handwritten ZIP code, serves as the input to the handwritten digit recognition system 100. Each letter in input stack 5 typically includes a return address block 6, a destination address block 7 and a stamp 8. An individual letter 10 is extracted from input stack 5 and fed to handwritten digit recognition system 100. Handwritten digit recognition system 100 attempts to locate the ZIP code of the destination address, and recognize the individual digits. Upon successful recognition of any ZIP code, handwritten digit recognition system 100 deposits each letter 10 into one of a set of ZIP sorted bins 20 based upon the recognized ZIP code digits. If no ZIP code was found or if the recognition process failed in some other manner letter 10 is deposited into reject bin 25.

Handwritten digit recognition system 100 includes camera 110, computer 120 and plural sorters 131, 132 . . . 137. Handwritten digit recognition system 100 operates as follows. Individual letters 10 are removed from input stack 5 and drawn past the field of view of camera 110. This operation preferably involves the use of some sort of track or conveyer system for carrying the letters. Such systems are well known in the art and will not be further described here. Letter 10 passes by the plural sorters 131, 132 . . . 137 and is either deposited into one of the ZIP sorted bins 20 by one of the sorters or is deposited into reject bin 25 if none of the sorters 131, 132 . . . 137 operates. Thus the mail is sorted into appropriate stacks.

Camera 110 forms a gray scale image of the entire envelope. This image is preferably of the raster scan type with each picture element or pixel represented by a plurality of data bits. In the preferred embodiment each pixel is an eight bit data word. Thus camera 110 encodes each pixel with one of 256 possible light intensity levels. This image may be formed with an analog television camera whose signal is supplied to an analog to digital converter having an output of eight bits. It is known in the art to provide an illumination source to provide the proper exposure at camera 110.

The gray scale image from camera 110 is supplied to computer 120. Computer 120 is constructed in a manner to optimize image operations. These image operations preferably include: thresholding of the gray scale image into a black/white image; image repair; location and extraction of the ZIP code within the image; division of the ZIP code into segmented images; classification of the individual digits; and sorting based upon the thus recognized ZIP code.

Computer 120 preferably operates to recognize handwritten characters forming the ZIP code as follows. Following initialization, computer 120 receives the gray scale image data from camera 110. This process preferably includes some indication of the completion of receipt of a valid image from camera 110 such as confirmation that a letter 10 has been viewed by camera 110.

Computer 120 then converts the gray scale image data into digital image data. The recognition process of this invention operates on a black/white image. Conversion to a black/white image is based upon a threshold gray level, which may be adaptively determined. Pixels having gray scale values below the threshold are converted to black. Those having gray scale values above the threshold are converted to white. Thus each pixel of the original image is classified as either a stroke pixel (black) or a background pixel (white).

Computer 120 next repairs the whole digital image. This repair process preferably includes deletion of very long vertical and horizontal lines and deletion of very small marks. This process may also include some preprocessing steps.

Computer 120 next analyzes the repaired and preprocessed digital image for location of the ZIP code block. There is no required location for the ZIP code though it is most often found at the end of the last line of the destination address. Because of the possibility of slanting lines and portions of characters that dangle below or raise above a particular line, it is not a simple process to separate the lines of the destination address block. Likewise it is not simple to determine which portions of a separated address line are the ZIP code. Computer 120 finds the ZIP code within the digital image if it can be found.

If computer 120 founds no such ZIP code block, the ZIP code recognition system fails. No sorting operation is possible for that letter. That letter 10 is deposited in reject bin 25. This is accomplished by failure to operate any of sorters 131, 132, . . . 137.

When computer 120 locates a ZIP code block, it then performs additional image repair on the ZIP code block. Because it all marks within the ZIP code block should be numerals, it is possible to perform additional, more aggressive repair on the ZIP code block. This is based on the knowledge of the characteristics of numerals.

Computer 120 next separates the ZIP code block into its individual digit images, a process called segmentation. This process preferably includes some manner of determining the proper separation of touching or crossing digits. This process also includes a determination of the proper grouping for separate character strokes. The result of segmentation is a set of segmented images corresponding to the individual digits of the ZIP code. Because ZIP codes can include either 5 or 9 digits, there will be either 5 or 9 of these segmented images for each letter. Computer 120 may then provide additional image repair on the individual segmented images.

Computer 120 then attempts to classify each of the segmented images. This process is central to the present invention and will be further detailed below.

Computer 120 next tests to determine if all segmented images for a particular letter were recognized. The letter sorting operation cannot be correctly performed unless computer 120 recognizes all the digits. Therefore, if computer 120 does not recognize all the digits the letter is sent to the reject bin 25. Computer 120 is then complete for that letter.

If computer 120 recognizes all the digits, then it assembles the individually recognized digits into the ZIP code. Computer 120 next tests to determine if the assembled ZIP code is a valid ZIP code. Not all the possible digit combinations correspond to valid ZIP codes. If the recognized digits correspond to a non-assigned ZIP code, then handwritten digit recognizer 100 cannot make a proper sorting decision. Thus that particular letter 10 is rejected and computer 120 is complete for that letter.

The sorters 131, 132 . . . 137 are controlled to sort the letter if the assembled ZIP code is valid. This process involves determination of the proper bin for the letter and operation of the appropriate sorter 131, 132 . . . 137 to deposit the letter in that bin. Computer 120 tracks the current location of the letter to determine when it is at the location of the appropriate sorter 131, 132 . . . 137. When letter 10 reaches the location of the appropriate sorter 131, 132 . . 137, then computer 120 activates this sorter to deposit the letter in the appropriate bin of ZIP sorted bins 20. Note that the sorting would depend on the location of the sorting office and the customary routing of mail to the various destinations. Computer 120 is then complete for that particular letter 10.

Figure 2:
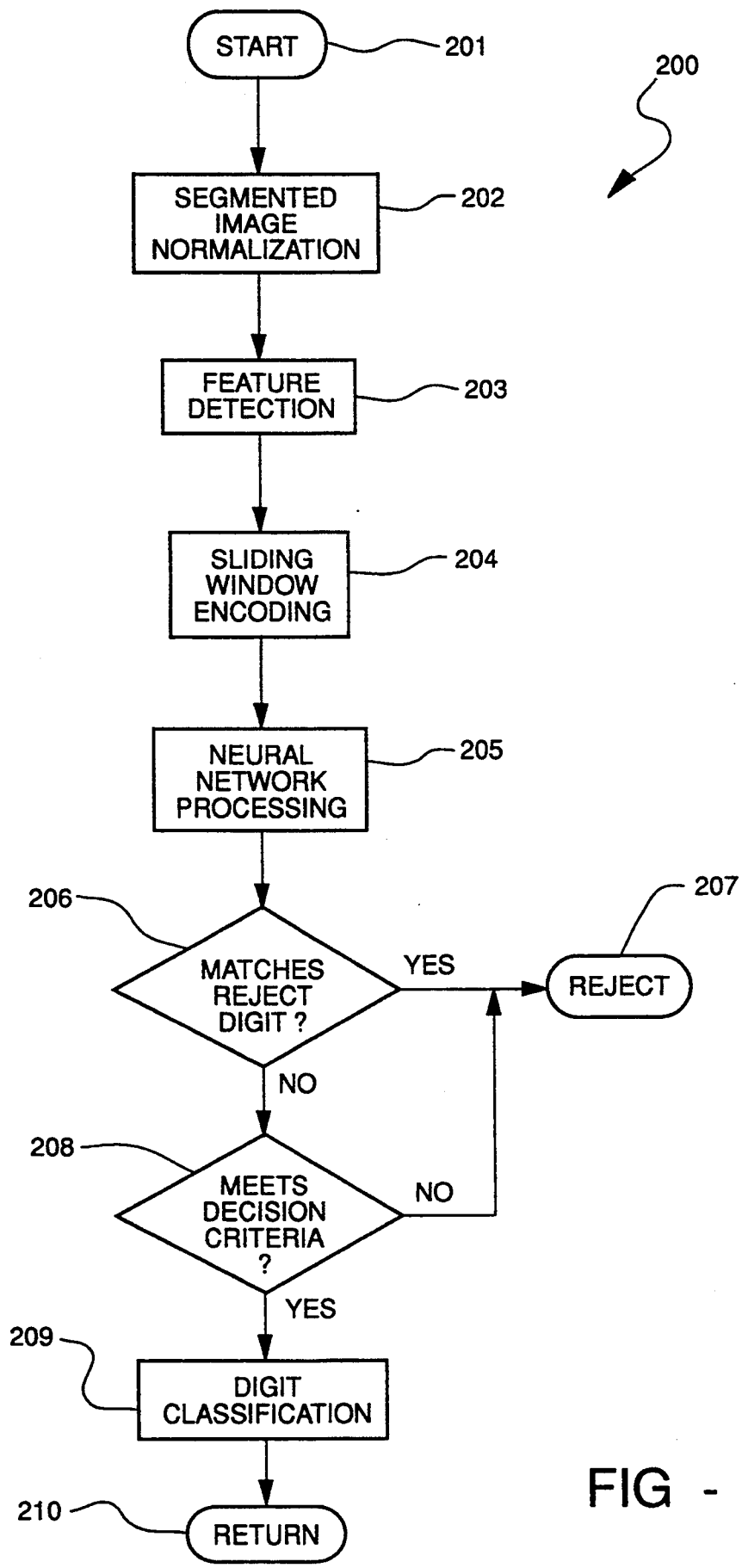
FIG. 2 illustrates in flow chart form the process of segmented digit recognition employed in the preferred embodiment of the present invention.

FIG. 2 illustrates a flow chart of program 200 intended to show the operation of the computer 120 for recognizing the numeral of segmented images in accordance with the present invention. Program 200 illustrated in FIG. 2 is not intended to show the exact details of the entire program for control of computer 120. Instead, program 200 is intended to illustrate only an outline of the operation of computer 120 in the recognition of individual segmented digits. Those skilled in the art would be able to provide the necessary exact computer program required from the present description once the design choices are made. The design choices include the type of computer used and its corresponding instruction set, and the size of neural network used.

Program 200 represents a description of the digit recognition process. Program 200 is executed once for each image to be recognized by the system. Program 200 begins at start block 201. Each segmented image is normalized (processing block 202). In the preferred embodiment computer 120 preserves the original image size and shape until this step. In some instances the preprocessing, particularly the determination of the location of the ZIP code block, the image repair and the digit segmentation, may operate on processed portions of the image such as skeletons and end points. The normalization of this invention presupposes that the portion of the original black/white image corresponding to the digit in question be preserved for digit recognition.

Normalization transforms each segmented image into a standard size and reduces the skew. In the preferred embodiment the standard size is 22 rows by 16 columns. Skew correction serves to reduce the variability in slant of the individual digits. Segmented image normalization makes the later recognition task much simpler by permitting recognition to take place on a universe of images with smaller variations.

The normalization technique of the preferred embodiment of the present invention transforms the segmented image, having a size m by n, into a new image within a 22 by 16 box. Note that the original black/white image may not fill the segmented image box. The normalized image preferably fills or substantially fills the new normalized image box. In some cases it is preferable to limit the horizontal expansion of the digit during normalization to a predetermined multiple of the vertical expansion. This serves to prevent gross distortions of narrow digits such as "1's." In the preferred embodiment this process employs moment normalization of the type disclosed in "Moment Normalization of Handprinted Characters", by R. G. Casey, *IBM Journal of Research and Development*, September 1970, pages 548 to 552. Let Char (x, y) be the image function of the segmented image, i.e. Char (x, y)=1 for foreground or stroke pixels and Char (x, y)=0 for background pixels. This technique involves a moment matrix M of the form:

$$M = \begin{pmatrix} m_x & m_{xy} \\ m_{xy} & m_y \end{pmatrix} \quad (1)$$

$$M = \frac{1}{T} \sum_{x=1}^{m} \sum_{y=1}^{n} \begin{pmatrix} x^2 & xy \\ xy & y^2 \end{pmatrix} \text{Char}(x, y) \quad (2)$$

where: $m_x$ is the x moment of the image; $m_y$ is the y moment of the image; $m_{xy}$ is the cross moment of the image; and $$T = \sum_{x=1}^{m} \sum_{y=1}^{m} \text{Char}(x, y),$$

that is the total number of stroke pixels in the original black/white image. The normalization process determines a linear transformation of the original x and y coordinates to new u and v coordinates of the form $u = A(x - x_0)$ and $v = A(y - Y_0)$, with $x_o$ and $Y_0$ being arbitrary origin coordinates. This linear transform is selected to diagonalizes the moment matrix M of the transformed image. Thus $m_{uv}=0$, $m_u=k$ and $m_v=h$, where k and h are arbitrary constants. The parameters k and h are used to determine the linear transform which satisfies the above constraints, particularly fitting the normalized digit into a 22 by 16 box. A closed form solution of this problem has not been found, however, an iterative technique gives satisfactory results. A suitable alternative form of segmented image normalization is disclosed in U.S. patent application No. 769,740 filed Oct. 2, 1991, entitled "HANDWRITTEN DIGIT NORMALIZATION METHOD" by Robert C. Vogt III and assigned to the assignee of this application.

Program 200 next detects the features of the normalized segmented image (processing block 203). The detected features are preferably formed by morphological transformation of the normalized segmented image. In the preferred embodiment the detected features are cavity features. These extracted cavity features include: north-cavity; south-cavity; east-cavity; west-cavity; center-cavity; and hole. A cavity is a region of background pixels surrounded on a least three sides by stroke pixels. The cavity names correspond to the side on which they open. Thus a west-cavity region is open to the west but bounded on the north, south and east. A center-cavity is bounded on all four sides but not completely enclosed by stroke pixels. A hole is a region completely enclosed by stroke pixels.

The morphological expressions for detection of the various cavity features are given in Table 1.

TABLE 1

North-cavity = (I⊕N) ∩ (I⊕S) ∩ (I⊕E) ∩ (I⊕W) ∩ Ī
South-cavity = (I⊕N) ∩ (I⊕S) ∩ (I⊕E) ∩ (I⊕W) ∩ Ī
East-cavity = (I⊕N) ∩ (I⊕S) ∩ (I⊕E) ∩ (I⊕W) ∩ Ī
West-cavity = (I⊕N) ∩ (I⊕S) ∩ (I⊕E) ∩ (I⊕W) ∩ Ī
Hole = Ī ∩ SPAN[Border, Ī, 4-way]
Center-cavity = (I⊕N) ∩ (I⊕S) ∩ (I⊕E) ∩ (I⊕W) ∩ Ī ∩ Hole In Table 1: I is the normalized segmented image; N is a north facing structuring element as illustrated in FIG. 4a; S is a south facing structuring element as illustrated in FIG. 4b; E is an east facing structuring element as illustrated in FIG. 4c; W is a west facing structuring element as illustrated in FIG. 4d; ⊕ is the dilation operator; ∪ is the intersection operator; Ā is the complement of A, i.e., the image A with the foreground and background pixels reversed; and the SPAN operator detects all areas of the background (Ī) reachable from the border of of the image using 4-way connectivity, i.e., north, south, east and west. Note that it is assumed in the north, south, east and west structuring elements of FIGS. 4a to 4d, respectively, are sufficiently long so that the dilation reaches the image edge from anywhere on the image.

Figure 5A:
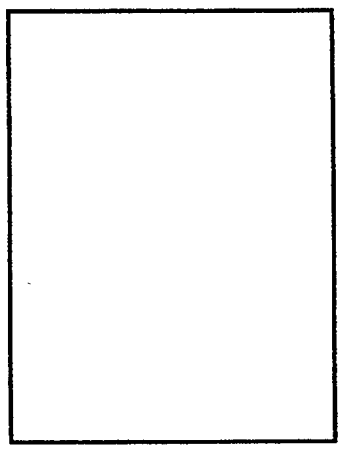
FIGS. 5a to 5f illustrate respective cavity features of the example digit of FIG. 3.
Figure 5B:
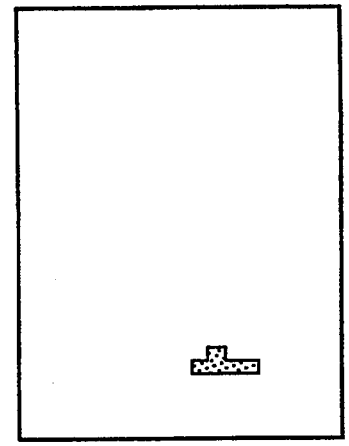
Figure 5C:
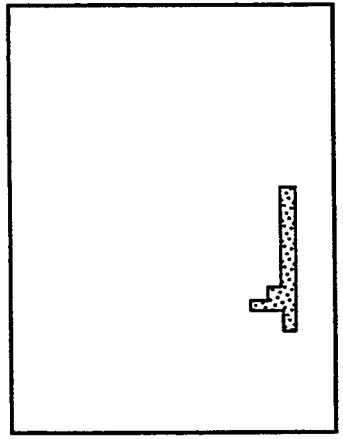
Figure 5D:
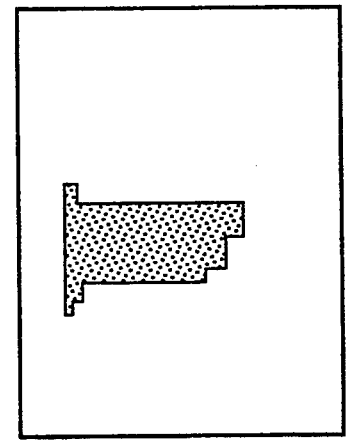
Figure 5E:
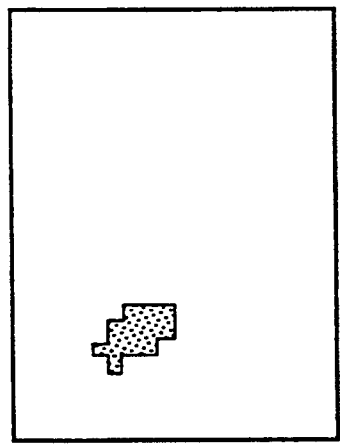
Figure 5F:
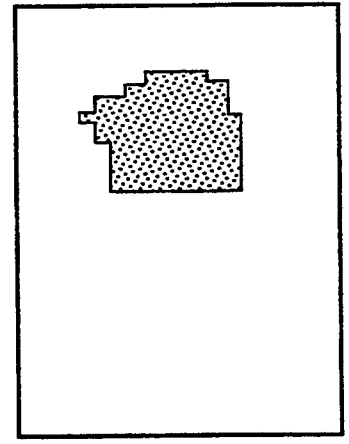

Seven feature images, each having the same size as the original normalized segmented image, result from this cavity feature detection. One of these feature images is the original segmented image, which is unchanged (see FIG. 3). There are separate feature images containing; north cavity pixels; south cavity pixels; east cavity pixels; west cavity pixels; hole pixels; and center cavity pixels. FIGS. 5a to 5f illustrate the six cavity feature images for the example numeral "2" illustrated in FIG. 3. FIG. 5a illustrates the north cavity pixels, which in the case of this example is the empty set. FIG. 5b illustrates south cavity pixels. FIG. 5c illustrates east cavity pixels. FIG. 5d illustrates west cavity pixels. FIG. 5e illustrates hole pixels. Lastly, FIG. 5f illustrates center cavity pixels.

Program 200 next codes each of these seven feature images for application to the neural network (processing block 204) using a sliding window. FIG. 3 illustrates schematically the coding of the original normalized segmented image. The image is divided into fifteen 8 by 8 subimages. These fifteen subimages are formed by the intersection of three overlapping horizontal windows 311, 313 and 315 of eight pixels in width and five overlapping vertical windows 321, 323, 325, 327 and 329 of eight pixels in height. A blank row 301 is added at the top of the image and a blank row 303 is added at the bottom of the image to because the 5 vertical overlapping vertical windows 321, 323, 325, 327 and 329 require 24 rows. An encoded value is formed for each subimage based upon the ratio of the total number of stroke pixels t to size s of the subimage in number of pixels. Note that the subimages defined by the windows illustrated in FIG. 3 each include 64 pixels. Each such encoded value is then normalized to the range of 0.1 to 0.9 according to the following equation:

$$V = 0.1 + 0.8 \times \frac{t}{s} \quad (3)$$

where: V is the normalized encoded value; t is the total number of stroke pixels in the subimage; and s is the number of pixels in the subimage, in this example 64. This coding of the seven feature images results in the production of 7×15=105 normalized encoded values V.

Figure 6:
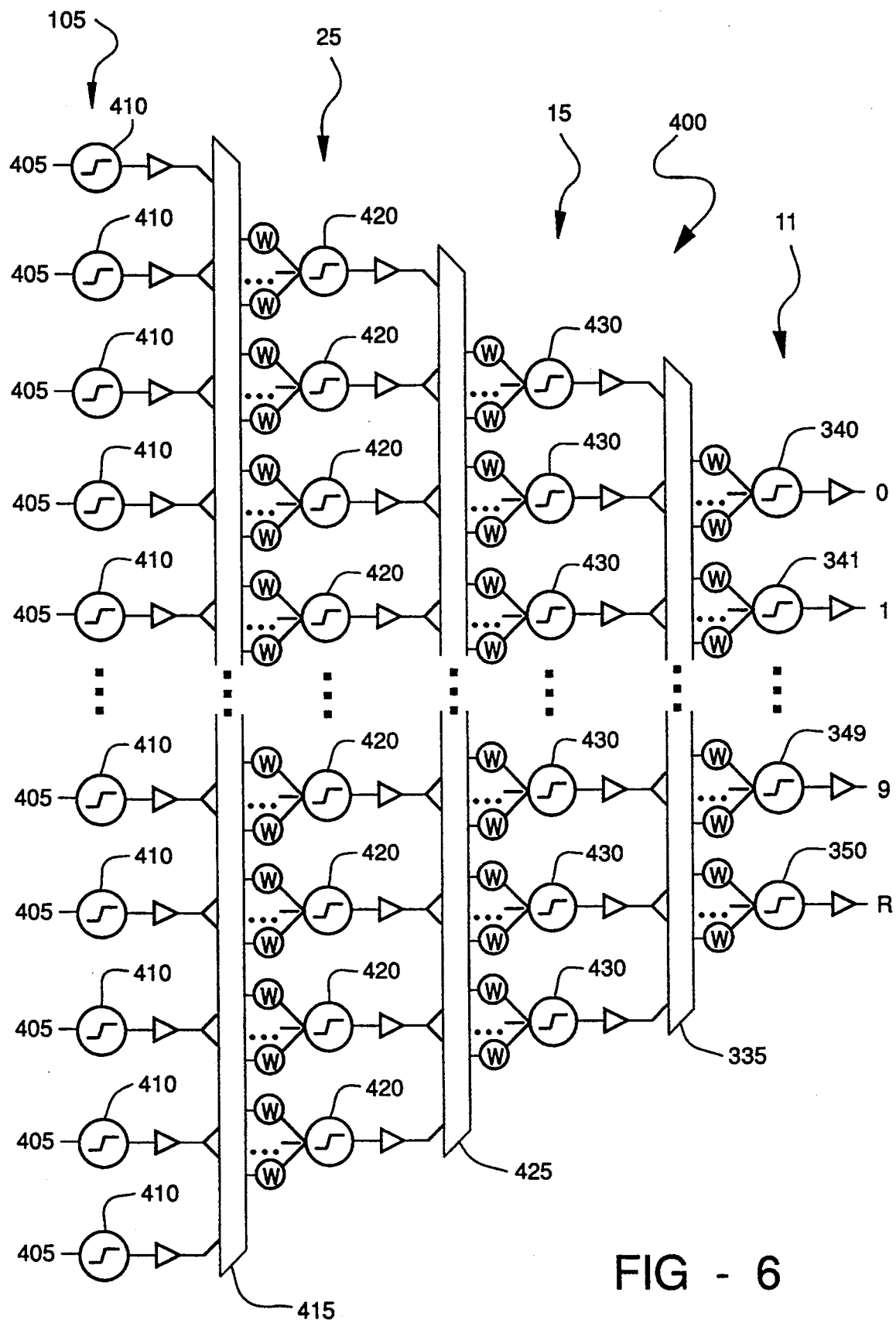
FIG. 6 illustrates schematically the neural network employed in the preferred embodiment of this invention.

These 105 normalized encoded values V for the feature images are processed via a neural network (processing block 205). The structure of the neural network is illustrated in FIG. 6. An input layer of the neural network 400 includes 105 nodes, one for each of the 15 window encoded values for each of the seven feature images. Each input neuron 410 includes an input terminal 405, a sigmoidal function and a buffer. Three layers of neurons follow having 25, 15 and 11 neurons respectively. The second layer includes neurons 420. Each neuron 420 includes 105 synaptic weights W, one coupled via interconnection network 415 to each input node, a summer/sigmoidal function and a buffer. In a like fashion the third layer includes 15 neurons 430, which are fully connected to the respective outputs of the 25 second neurons 420 via interconnection network 425. Last is an output layer including 11 neurons 440 to 450. Each neuron 440 to 450 in the output layer is connected to the output of each neuron 430 of the third layer via interconnection network 435.

The output of neural network 400 is place coded. Each neuron 440 to 449 of the output layer corresponds to one of the digit candidates 1 to 9. Classification takes place by detection of an output above a recognition threshold at an output node for the corresponding digit candidate together with suitably low responses at the remaining output nodes. The output node 450 is a special case. As will be explained below, this output node is trained on non-digit images and difficult to recognize digit images. A response above a predetermined rejection threshold on this reject node 450 causes rejection of the image without classification. Any other output of the output nodes 440 to 450 also causes rejection of image without classification.

Training of neural network 400 takes place by conventional error back propagation. A training set including a number of images for each candidate digit is selected. As explained further below this training set includes some non-digit characters. The training set is preferably taken from actual scanned U.S. Mail ZIP codes. The synaptic weights of the neurons are randomly set in the range between −0.1 and 0.1. Individual images of the training set, normalized and feature encoded as explained above, are presented to the neural network in a random order. For each presentation the actual classification of the image determines a target output set. This target output set includes the value 0.9 for the output node corresponding to the correct image classification and the value 0.1 for each node corresponding to an incorrect image classification. For each output node a signed error term, equal to the difference between the desired output and the actual output, is formed. The synaptic weights of each neuron in the output layer is adjusted by a fraction of the corresponding error term. In the preferred embodiment this learning constant is 0.1. This same error back propagation process takes place for each layer of neurons until all the synaptic weights have been adjusted. Then the next image is presented and the process of synaptic weight adjustment is repeated. This learning process may take place for a number of presentations of each image of the training set up to several hundred. The synaptic weights of the neurons are then fixed. Note that this learning process is needed only once for each different type of image recognition problem. Once the synaptic weights are determined, this invention can be practiced with a neural network having fixed synaptic weights.

Individual candidate recognition thresholds are set using an independent threshold set. This threshold set is preferably selected in the same manner as the training set, except that these are independently occurring images that do not overlap the training set. Recognition thresholds are empirically set for each candidate digit to maximize a correct/incorrect classification cost function. Setting a recognition threshold higher tends to decrease correct classifications but decrease incorrect classifications, and vice versa. Due to the large expense in resorting misclassified mail, the classification cost function preferably subtracts more for a misclassification than is added for a correct classification. Once these recognition thresholds are determined for a particular neural network, neural network 400 is ready for digit recognition.

Further mention should be made regarding selection of the non-digit images for training the reject output node 450. The intent is to provide a classification to absorb non-digit images and digit images which are so distorted that no attempt should be made at machine recognition. It would seem to be difficult or impossible to provide a training set intended to represent all non-classifiable images. This has not proved the case. It should be understood that the portion of the total feature space occupied by digit clusters corresponding to classifiable digit images is very, very small. Thus it is likely that by sparsely populating the remaining feature space with non-digit clusters, a non-digit or badly rendered digit would be closer to one of the non-digit clusters than to one of the digit clusters. Thus a non-digit output node serves to prevent misclassification.

In the present application several types of non-digit images are used to train the non-digit output node. At least some of the images should be erroneously classified or rejected images of the neural network in the absence of the non-digit output node. These images would include badly rendered digits and the like. Some of the images should be characters which may be misidentified as included in the ZIP code block. Lastly, some of the images should be improperly segmented digits. It is known that the process of segmenting the individual digits of a correctly identified ZIP code block includes some errors. Thus some of the non-digit image training set should include actually scanned U.S. Mail in which the digit segmentation process has failed. By recognition of these non-digits the number of misclassifications can be reduced without reducing the number of correctly classified images.

Returning back to FIG. 2, program 200 determines if the image matches the reject digit criteria (decision block 206). This determination is based upon whether the output of the non-digit output node exceeds a corresponding rejection threshold. If so, this image is rejected (end block 207). This rejection results in rejection of the ZIP code and rejection of that particular letter into reject bin 25. Program 200 next tests to determine if the image meets the decision criteria for any digit class (decision block 208). As previously described, each output node of the neural network 400 has a corresponding recognition threshold for digit recognition. If the image meets no decision criteria, then it is rejected (end block 207). If the image meets a decision criteria, then the image is classified according to that decision criteria (processing block 209). Program 200 is then complete for that image and control returns to the calling program (end block 210).

FIGS. 7a to 7g, 8a and 8b illustrate an alternative embodiment of the feature detection step of processing block 203. FIG. 7a illustrates the normalized image of an uppercase K. FIGS. 7b to 7g illustrate various smear distortions of the original image 7a. These smear distortions include north, south, east, west smears as well as a horizontal smear and a vertical smear. The morphological expressions for detection of the various smear features are given in Table 2.

TABLE 2

| |
|---|
| North-smear = $\overline{(\overline{I} \oplus N)}$ |
| South-smear = $\overline{(\overline{I} \oplus S)}$ |
| East-smear = $\overline{(\overline{I} \oplus E)}$ |
| West-smear = $\overline{(\overline{I} \oplus W)}$ |
| Horizontal-smear = $\overline{(\overline{I} \oplus H)}$ |
| Vertical-smear = $\overline{(\overline{I} \oplus V)}$ |

In Table 2: I is the normalized segmented image; N is a north facing structuring element as illustrated in FIG. 4a; S is a south facing structuring element as illustrated in FIG. 4b; E is an east facing structuring element as illustrated in FIG. 4c; W is a west facing structuring element as illustrated in FIG. 4d; H is a small horizontally oriented structuring element as illustrated in FIG. 8a; V is a small horizontally oriented structuring element as illustrated in FIG. 8b; $\oplus$ is the dilation operator; $\overline{A}$ is the complement of A, i.e., the image A with the foreground and background pixels reversed. This process results in seven feature images as before. FIGS. 7a to 7g illustrate these seven feature images for this example. FIG. 7a illustrates original image. FIG. 7b illustrates the north smear image. FIG. 7c illustrates the south smear image. FIG. 7d illustrates the east smear image. FIG. 7e illustrates the west smear image. FIG. 7f illustrates the image smeared in the horizontal. Lastly, FIG. 7g illustrates image smeared in the vertical. These images are window encoded for presentation to neural network 400 as in the case of cavity feature detection.

Figure 9:
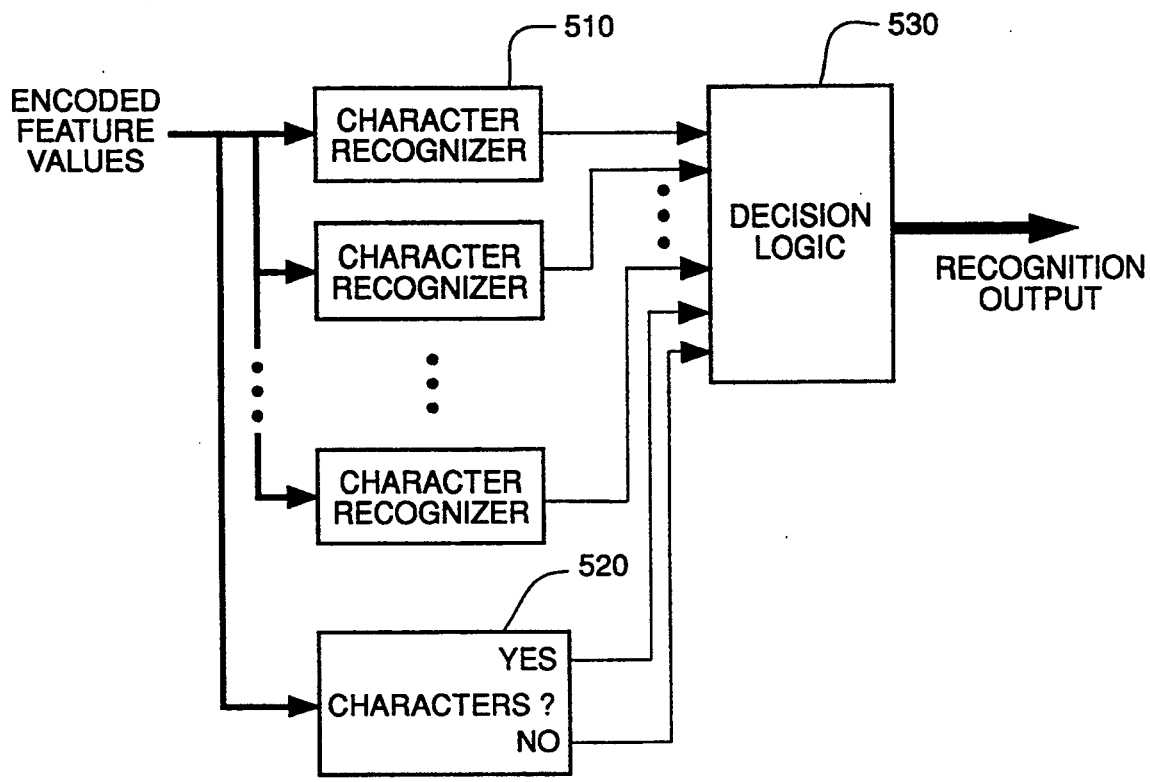
FIG. 9 illustrates an alternative embodiment of the character recognizer of this invention.
Figure 10:
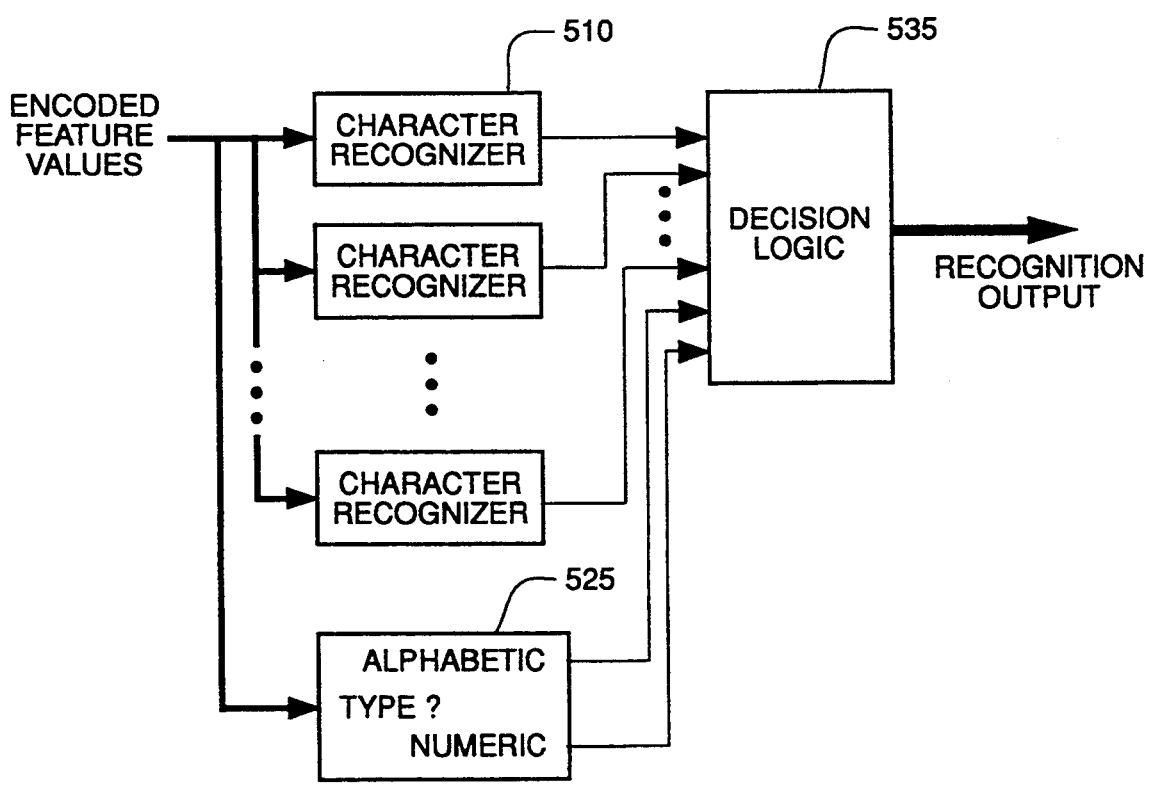
FIG. 10 illustrates a further alternative embodiment of the character recognizer of this invention.

FIGS. 9 and 10 illustrate alternative embodiments of the present invention. In FIG. 9 the encoded features are supplied to plural character recognizers 510 and to a character determination circuit 520. One character recognizer 510 is provided for each candidate character to be recognized. Each character recognizer 510 produces and output indicating the degree of similarity between the input image and the corresponding candidate character. Character determination circuit 520 includes Yes and No outputs. Character determination circuit 520 generates a Yes output indicating the likelihood that the input image is one of the candidate characters. Character determination circuit 520 generates a No output indicating the likelihood that the input image is not one of the candidate characters. Character recognizers 510 and character determination circuit 520 may be embodied in a neural network circuit such as neural network circuit 400 illustrated in FIG. 6. Decision logic 530 makes a determination of the character of the input image based upon the outputs from character recognizers 510 and character determination circuit 520. In the simplest case decision logic 530 recognizes the input image if the output of the corresponding character recognizer 510 exceeds a predetermined recognition threshold and rejects recognition if the Yes and No outputs from character determination circuit 520 indicates a greater likelihood that the input image is not a candidate character than that it is a candidate character. In a more complex case, decision logic 530 would adjust the recognition thresholds based upon the Yes and No outputs from character determination circuit 520. The recognition thresholds would be greater if the Yes and No outputs from character determination circuit 520 indicated a low likelihood that the input image was one of the candidate characters. The recognition thresholds would be less if character determination circuit 520 indicated a high likelihood of a candidate character. These recognition thresholds are optionally adjusted based upon the magnitude of the Yes and No outputs.

The recognition circuit of FIG. 10 is useful in the case of mixed alphabetic and numeric characters. This would occur in a scanned address which would generally include some letters and some numbers in the address. In FIG. 10 the character recognition circuits 510 include circuits for both alphabetic and numeric candidate characters. Type determination circuit 525 generates an alphabetic output indicative of the degree of likelihood that the input image is an alphabetic character and a numeric output indicative of the degree of likelihood that the input image is a numeric character. As noted above in conjunction with FIG. 9, character recognizers 510 and type determination circuit 525 may be embodied in a neural network circuit. Decision logic 535 operates in a manner similar to decision logic 530. In a first case, decision logic 535 recognizes the input image if the output of the corresponding character recognizer 510 exceeds a predetermined recognition threshold and the outputs of type determination circuit 525 indicate a greater likelihood that the input image is of the proper type than that it is not of the proper type. In a second case, decision logic 535 would adjust the recognition thresholds based upon the alphabetic and numeric outputs from type determination circuit 525. The recognition thresholds for alphabetic characters would be greater if the outputs from type determination circuit 525 indicated a low likelihood that the input image was an alphabetic character. Similarly the recognition thresholds for numeric characters would be greater if type determination circuit 525 indicated a low likelihood that the input character is a numeric character. The recognition thresholds would be less if type determination circuit 525 indicated a high likelihood of a candidate character of that type. Those skilled in the art would realize that this same technique can be used for any mutually exclusive sets of candidate characters.

Those skilled in the art would realize that a number of variations are possible without departing from the scope of the invention. As examples only, the encoding window used in feature image encoding could be reduced in size to 6 by 6 pixels rather than 8 by 8 pixels. This would increase the number of encoded values to $7 \times 35 = 245$. The neural network must be similarly enlarged to include 245 input nodes. It is known in the art that neural network 400 need not be embodied in actual hardware. Neural network 400 my be simulated via a general purpose computer. The results would be identical, however the typical computer simulation of a neural network would take greater time than embodiment in hardware. It should be understood that this technique is not limited to recognition of handwritten digits. This invention may be employed for recognition of a particular handwritten character from another set of candidate characters such as mathematical symbols or letters. It is feasible to provide plural non-digit output nodes having differing recognition characteristics. The image would be rejected if any of these non-digit output nodes produces an output exceeding a corresponding predetermined rejection threshold. The invention, though described in conjunction with recognition of unconstrained handwritten characters, may also be used in recognition of machine printed or typed characters. This invention enables recognition using more noisy data for machine printed or typed characters than otherwise needed. This permits a reduction in system cost through the use of a less sophisticated and less costly scanning system.

We claim:

1. A method for recognition of an unconstrained written digit image, consisting of stroke pixels and background pixels, as one of a set of candidate digits comprising the steps of:

forming a corresponding normalized image of predetermined pixel dimensions from the unconstrained written digit image;

forming at least one feature image of said predetermined pixel dimensions from said normalized image, each feature image including only pixels exhibiting a predetermined feature of said normalized image;

computing a set of at least one encoded value for said normalized image and for each of said at least one feature image;

supplying said encoded values of each set to a neural network, said neural network having a layer of input neurons, the number of input neurons equal to the number of said encoded values, each input neuron receiving a corresponding one of said encoded values, at least one layer of hidden neurons, and a layer of output neurons, the number of output neurons equal to one more than the number of digits in the set of candidate digits, said output neurons including a non-digit output neuron and an output neuron corresponding to each of said candidate digits, each of said hidden neurons and each of said output neurons having predetermined synaptic weights, each of said hidden neurons and each of said output neurons forming an output consisting of a sigmoidal function of a sum of the outputs of a prior layer of neurons multiplied by a corresponding synaptic weight;

rejecting recognition of the unconstrained written digit image as one of said candidate digits if said non-digit output neuron produces an output exceeding a predetermined non-digit rejection threshold; and recognizing the unconstrained written digit image as one of said candidate digits only if a) said output neuron corresponding to said candidate digit produces an output exceeding a corresponding predetermined digit recognition threshold, and b) said non-digit output neuron does not produce an output exceeding said predetermined non-digit rejection threshold.

2. The method for recognition of an unconstrained written digit image as claimed in claim 1, wherein:

said step of forming at least one feature image consists of forming a morphological transformation of said normalized image.

3. The method for recognition of an unconstrained written digit image as claimed in claim 2, wherein:

said step of forming at least one feature image wherein said predetermined feature of said normalized image is a cavity feature.

4. The method for recognition of an unconstrained written digit image as claimed in claim 3, wherein:

said step of forming at least one feature image forms a North cavity feature image including only pixels within said normalized image in a North cavity, a South cavity feature image including only pixels within said normalized image in a South cavity, an East cavity feature image including only pixels within said normalized image in an East cavity, a West cavity feature image including only pixels within said normalized image in a West cavity, a Hole image including only pixels within said normalized image in a Hole, and a Center cavity feature image including only pixels within said normalized image in a Center cavity according to the morphological equations $$N_{cav} = \overline{(I \oplus N)} \cap \overline{(I \oplus S)} \cap \overline{(I \oplus E)} \cap \overline{(I \oplus W)} \cap \overline{I}$$
$$S_{cav} = \overline{(I \oplus N)} \cap \overline{(I \oplus S)} \cap \overline{(I \oplus E)} \cap \overline{(I \oplus W)} \cap \overline{I}$$
$$E_{cav} = \overline{(I \oplus N)} \cap \overline{(I \oplus S)} \cap \overline{(I \oplus E)} \cap \overline{(I \oplus W)} \cap \overline{I}$$
$$W_{cav} = \overline{(I \oplus N)} \cap \overline{(I \oplus S)} \cap \overline{(I \oplus E)} \cap \overline{(I \oplus W)} \cap \overline{I}$$
$$H = \overline{I} \cap \overline{SPAN[Border, \overline{I}, 4\text{-way}]}$$
$$C_{cav} = \overline{(I \oplus N)} \cap \overline{(I \oplus S)} \cap \overline{(I \oplus E)} \cap \overline{(I \oplus W)} \cap \overline{I} \cap \overline{Hole}$$

where: $N_{cav}$ is the North cavity feature image; $S_{cav}$ is the South cavity feature image; $E_{cav}$ is the East cavity feature image; $W_{cav}$ is the West cavity feature image; H is a Hole feature image; $C_{cav}$ is the Center cavity feature image; I is said normalized image; N is a north facing structuring element; S is a south facing structuring element; E is an east facing structuring element; W is a west facing structuring element; $\oplus$ is the dilation operator; $\cup$ is the intersection operator; $\overline{A}$ is the complement of A, i.e., the image A with the foreground and background pixels reversed; and the SPAN operator detects all areas of the background ($\overline{I}$) reachable from the border of the image using 4-way connectivity, i.e., north, south, east and west.

5. The method for recognition of an unconstrained written digit image as claimed in claim 2, wherein:

said step of forming at least one feature image wherein said predetermined feature of said normalized image is a smear of the stroke pixels of said normalized image.

6. The method for recognition of an unconstrained written digit image as claimed in claim 5, wherein:

said step of forming at least one feature image forms a North smear feature image, a South smear feature image, an East smear feature image, a West smear feature image, a horizontally smeared feature image, and a vertically smeared feature image according to the morphological equations $$N_{smr} = \overline{(I \oplus N)}$$

$$S_{smr} = \overline{(I \oplus S)}$$

$$E_{smr} = \overline{(I \oplus E)}$$

$$W_{smr} = \overline{(I \oplus W)}$$

$$H_{smr} = \overline{(I \oplus H)}$$

$$V_{smr} = \overline{(I \oplus V)}$$

where: $N_{smr}$ is the North smear feature image; $S_{smr}$ is the South smear feature image; $E_{smr}$ is the East smear feature image; $W_{smr}$ is the West smear feature image; $H_{smr}$ is horizontally smeared feature image; $V_{smr}$ is the vertically smeared feature image; I is said normalized image; N is a north facing structuring element; S is a south facing structuring element; E is an east facing structuring element; W is a west facing structuring element; H is a small horizontally oriented structuring element; V is a small horizontally oriented structuring element; $\oplus$ is the dilation operator; $\overline{A}$ is the complement of A, i.e., the image A with the stroke and background pixels reversed.

7. The method for recognition of an unconstrained written digit image as claimed in claim 1, wherein:
said step of forming said corresponding normalized image of predetermined pixel dimensions forms said normalized image having 22 rows and 16 columns of pixels; and
said step of computing a set of at least one encoded value for said normalized image and for each of said at least one feature image includes
dividing said normalized image and each of said at least one feature image into a plurality of subimages employing
three overlapping vertical windows, each overlapping vertical window having eight columns and overlapping four columns with adjacent vertical windows, and
five overlapping horizontal windows, each overlapping horizontal window having of eight rows and overlapping four rows with adjacent horizontal windows, an uppermost horizontal window including an additional row above said normalized digit empty of pixels and a lowermost horizontal window including an additional row below said normalized image empty of pixels,
computing a numerical measure of the number of pixels within each subimage consisting of a ratio of the number of stroke pixels within said subimage divided by the size of said subimage in pixels, and
normalizing said computed numerical measures to the range of 0.1 to 0.9.

8. The method for recognition of an unconstrained written digit image as claimed in claim 1, wherein:
said step of forming said corresponding normalized image of predetermined pixel dimensions forms said normalized image having 22 rows and 16 columns of pixels; and
said step of computing a set of at least one encoded value for said normalized image and for each of said at least one feature image includes
dividing said normalized image and each of said at least one feature image into a plurality of subimages employing
five overlapping vertical windows, each overlapping vertical window having six columns and overlapping three columns with adjacent vertical windows, and
seven overlapping horizontal windows, each overlapping horizontal window having of six rows and overlapping three rows with adjacent horizontal windows, an uppermost horizontal window including an additional row above said normalized digit empty of pixels and a lowermost horizontal window including an additional row below said normalized image empty of pixels,
computing a numerical measure of the number of pixels within each subimage consisting of a ratio of the number of stroke pixels within said subimage divided by the size of said subimage in pixels, and
normalizing said computed numerical measures to the range of 0.1 to 0.9.

9. The method for recognition of an unconstrained written digit image as claimed in claim 1, further comprising:
setting said predetermined synaptic weights of said neural network by
randomly setting each synaptic weight within a predetermined range,
selecting a training set of images including digit images of each candidate digit and non-digit images,
forming a corresponding normalized image of predetermined pixel dimensions from each image of said training set,
forming said at least one feature image of said predetermined pixel dimensions from each normalized training image,
computing said set of at least one encoded value for each normalized training image and for each of said at least one feature image of each normalized training image,
sequentially supplying said set of at least one encoded value of each training image to said neural network,
forming an error term for each output neuron for each supply of said set of at least one encoded value for each supply of a training image to said neural network, said error term consisting of a signed difference between a desired output corresponding to the correct classification of said image of said training set of images and the actual output,
adjusting said synaptic weights of each output neuron and said synaptic weights of each hidden neuron in a direction to minimize said error terms.

10. The method for recognition of an unconstrained written digit image as claimed in claim 9, wherein:
said step of setting said predetermined synaptic weights of said neural network wherein
said step of selecting a training set of images includes selecting images which when presented to said neural network result in no output on any of said digit output neuron exceeding said corresponding character recognition threshold.

11. The method for recognition of an unconstrained written digit image as claimed in claim 9, wherein:
said step of setting said predetermined synaptic weights of said neural network wherein
said step of selecting a training set of images includes selecting images which when presented to said neural network result in an output on at least one of said digit output neuron of corresponding to an incorrect digit exceeding said corresponding character recognition threshold.

12. The method for recognition of an unconstrained written digit image as claimed in claim 9, further comprising:
segmenting a portion of an unconstrained written document of a plurality of characters to form the written digit image; and
said step of setting said predetermined synaptic weights of said neural network wherein
said step of selecting a training set of images includes selecting images incorrectly segmented during said segmenting step.

13. The method for recognition of an unconstrained written digit image as claimed in claim 9, further comprising:
setting said predetermined non-digit rejection threshold and said predetermined digit recognition thresholds by
selecting a threshold set of images including digit images of each candidate digit and non-digit images, said threshold set of images having no image in common with said training set of images, forming a corresponding normalized image of predetermined pixel dimensions from each image of said threshold set, forming said at least one feature image of said predetermined pixel dimensions from each normalized thereshold image, computing said set of at least one encoded value for each normalized threshold image and for each of said at least one feature image of each normalized threshold image, sequentially supplying said set of at least one encoded value of each threshold image to said neural network, selecting said predetermined non-digit rejection threshold and said predetermined digit recognition thresholds to maximize a predetermined correct/incorrect classification cost function.

14. A method for recognition of an unconstrained written character image as one of a set of candidate characters comprising the steps of:

providing a set of character recognizers including a character recognizer for each character of the candidate set, each character recognizer producing an output indicating a degree of similarity between a corresponding candidate character and a presented unconstrained written character image;

providing at least one non-character recognizer, each non-character recognizer producing an output indicating a degree of similarity between a corresponding non-character and a presented unconstrained written character image;

presenting the unconstrained written character image to each character recognizer and to each non-character recognizer;

recognizing the uncontrained written character based upon the degree of similarity outputs of said set of character recognizers and rejecting the unconstrained written character based on the similarity output of said at least one non-character recognizer.

15. The method for recognition of an unconstrained written character image as claimed in claim 14, wherein:

said step of recognizing or rejecting recognition of the unconstrained written character includes rejecting recognition of the unconstrained written character image as one of said candidate characters if any of said non-character recognizers produces a degree of similarity output exceeding a corresponding predetermined non-character rejection threshold; and recognizing the unconstrained written character image as one of said candidate characters only if a) said character recognizer corresponding to said candidate character produces a degree of similarity output exceeding a corresponding predetermined character recognition threshold, and b) none of said at least one non-character recognizers produces a degree of similarity output exceeding said corresponding predetermined non-character rejection threshold.

16. The method for recognition of an unconstrained written character image as claimed in claim 14, wherein:

said step of recognizing or rejecting recognition of the unconstrained written character includes recognizing the unconstrained written character image as one of said candidate characters if said character recognizer corresponding to said candidate character produces a degree of similarity output exceeding a corresponding recognition threshold, said corresponding recognition threshold being dependent upon the degree of similarity output of said at least one non-character recognizers whereby said corresponding recognition threshold is greater for a greater degree of similarity output from said at least one non-character recognizers, and otherwise rejecting recognition of the unconstrained written character image as one of said candidate characters.

17. The method for recognition of an unconstrained written character image as claimed in claim 14, further comprising:

forming a corresponding normalized image of predetermined pixel dimensions from the unconstrained written character image before said presentation to each character recognizer and to each non-character recognizer.

18. The method for recognition of an unconstrained written character image as claimed in claim 14, further comprising:

training each of said at least one non-character recognizers based upon a training set of images including images which when presented to said set of character recognizers result in no degree of similarity output on any of said character recognizer exceeding said corresponding character recognition threshold.

19. The method for recognition of an unconstrained written character image as claimed in claim 14, further comprising:

training each of said at least one non-character recognizers based upon a training set of images including images which when presented to said set of character recognizers result in a degree of similarity output on at least one of said character recognizers corresponding to an incorrect character exceeding said corresponding character recognition threshold.

20. The method for recognition of an unconstrained written character image as claimed in claim 14, further comprising:

segmenting a portion of an unconstrained written document of a plurality of characters to form the written character image; and training each of said at least one non-character recognizers based upon a training set of images including images incorrectly segmented during said segmenting step.

21. The method for recognition of an unconstrained written character image as claimed in claim 14, wherein:

said set of candidate characters consists of the digits 0, 1, 2, 3, 4, 5, 6, 7, 8 and 9.

22. The method for recognition of an unconstrained written character image as claimed in claim 14, wherein:

said set of character recognizers and said at least one non-character recognizer are embodied in a neural network.

23. A method for recognition of an unconstrained written character image as one of a set of candidate characters comprising the steps of:

providing a set of character recognizers including a character recognizer for each character of the candidate set, each character recognizer producing an output indicating a degree of similarity between a corresponding candidate character and a presented unconstrained written character image;

providing a character type recognizer, said character type recognizer producing an output indicating a degree of likelihood that a presented unconstrained written character image is within each character type of a set of mutually exclusive, exhaustive character types;

presenting the unconstrained written character image to each character recognizer and to said character type recognizer; and recognizing or rejecting recognition of the unconstrained written character based upon the degree of similarity outputs of said set of character recognizers and the degree of likelihood outputs of said character type recognizer.

24. The method for recognition of an unconstrained written character image as claimed in claim 23, wherein:

said step of recognizing or rejecting recognition of the unconstrained written character includes recognizing the unconstrained written character image as one of said candidate characters only if a) said character recognizer corresponding to said candidate character produces a degree of similarity output exceeding a corresponding predetermined character recognition threshold, and b) said character type recognizer produces a degree of likelihood output exceeding a corresponding predetermined character type threshold for the character type corresponding to said candidate character; and otherwise rejecting recognition of the unconstrained written character.

25. The method for recognition of an unconstrained written character image as claimed in claim 23, wherein:

said step of recognizing or rejecting recognition of the unconstrained written character includes recognizing the unconstrained written character image as one of said candidate characters if said character recognizer corresponding to said candidate character produces a degree of similarity output exceeding a corresponding recognition threshold, said corresponding recognition threshold being dependent upon the degree of likelihood output of said character type recognizer for the corresponding character type, whereby said corresponding recognition threshold is greater for a smaller degree of likelihood output from said character type recognizer, and otherwise rejecting recognition of the unconstrained written character image as one of said candidate characters.

26. The method for recognition of an unconstrained written character image as claimed in claim 23, wherein:

said candidate characters include both alphabetic characters and numeric characters; and said character type recognizer produces an alphabetic output indicating a degree of likelihood that a presented unconstrained written character image is an alphabetic character and a numeric output indicating a degree of likelihood that a presented unconstrained written character image is numeric character.

27. A method for recognition of an unconstrained written character image as one of a set of candidate characters comprising the steps of:

segmenting a portion of an unconstrained written document of a plurality of characters to form the written character image;

providing a set of character recognizers including a character recognizer for each character of the candidate set, each character recognizer producing an output indicating a degree of similarity between a corresponding non-character and a presented unconstrained written character image;

providing at least one non-character recognizer, each non-character recognizer producing an output indicating a degree of similarity between a corresponding non-character and a presented unconstrained written character image;

training each of said at least one non-character recognizers based upon a training set of images including a) images which when presented to said set of character recognizers result in no degree of similarity output on any of said character recognizer exceeding said corresponding character recognition threshold, b) images which when presented to said set of character recognizers result in a degree of similarity output on at least one of said character recognizers corresponding to an incorrect character exceeding said corresponding character recognition threshold, and c) images incorrectly segmented during said segmenting step;

presenting the written character image to each character recognizer and to each non-character recognizer; and recognizing or rejecting recognition of the unconstrained written character based upon the degree of similarity outputs of said set of character recognizers and said at least one non-character recognizer.

28. The method for recognition of an unconstrained written character image as claimed in claim 27, wherein:

said step of recognizing or rejecting recognition of the unconstrained written character includes rejecting recognition of the unconstrained written character image as one of said candidate characters if any of said non-character recognizers produces a degree of similarity output exceeding a corresponding predetermined non-character rejection threshold; and recognizing the unconstrained written character image as one of said candidate characters only if a) said character recognizer corresponding to said candidate character produces a degree of similarity output exceeding a corresponding predetermined character recognition threshold, and b) none of said at least one non-character recognizers produces a degree of similarity output exceeding said corresponding predetermined non-character rejection threshold.

29. The method for recognition of an unconstrained written character image as claimed in claim 27, wherein:

said step of recognizing or rejecting recognition of the unconstrained written character includes recognizing the unconstrained written character image as one of said candidate characters if said character recognizer corresponding to said candidate character produces a degree of similarity output exceeding a corresponding recognition threshold, said corresponding recognition threshold being dependent upon the degree of similarity output of said at least one non-character recognizers whereby said corresponding recognition threshold is greater for a greater degree of similarity output from said at least one non-character recognizers, and otherwise rejecting recognition of the unconstrained written character image as one of said candidate characters.

30. The method for recognition of an unconstrained written character image as claimed in claim 27, wherein:

said set of candidate characters consists of the digits 0, 1, 2, 3, 4, 5, 6, 7, 8 and 9.

31. The method for recognition of an unconstrained written character image as claimed in claim 27, wherein:

said set of character recognizers and said at least one non-character recognizer are embodied in a neural network.

* * * * *